United States Patent
DeThomas et al.

[11] Patent Number: 6,137,108
[45] Date of Patent: Oct. 24, 2000

[54] INSTRUMENT AND METHOD FOR SPECTROSCOPIC ANALYSIS BY REFLECTANCE AND TRANSMITTANCE

[75] Inventors: Frank A. DeThomas, Woodstock; Jeffrey W. Hall, Ellicott; Ken VonBargen, College Park, all of Md.

[73] Assignee: Foss NIRSystems Incorporated, Silver Springs, Md.

[21] Appl. No.: 09/098,539

[22] Filed: Jun. 17, 1998

[51] Int. Cl.[7] .......................... G01N 21/01; G01N 21/25; G01N 21/47

[52] U.S. Cl. .................. 250/339.07; 250/339.11; 250/339.12; 250/341.2; 250/341.8; 356/73; 356/342; 356/440; 356/328

[58] Field of Search ...................... 356/445–448, 356/336, 342, 337–341, 410, 440, 335, 338, 339, 432–439, 441–444, 73; 250/574, 227.11–227.24, 341.2, 341.8, 339.07, 339.09, 339.11, 339.12; 385/12, 13

[56] References Cited

U.S. PATENT DOCUMENTS

| | | |
|---|---|---|
| 3,327,584 | 6/1967 | Kissinger . |
| 4,497,577 | 2/1985 | Sato et al. . |
| 4,827,143 | 5/1989 | Munakata et al. . |
| 5,044,755 | 9/1991 | Landa et al. . |
| 5,051,551 | 9/1991 | Doyle . |
| 5,261,410 | 11/1993 | Alfano et al. . |
| 5,303,036 | 4/1994 | McLachlan et al. . |
| 5,311,283 | 5/1994 | Heeschen . |
| 5,418,615 | 5/1995 | Doyle . |
| 5,708,273 | 1/1998 | VonBargen . |

*Primary Examiner*—F. L. Evans
*Attorney, Agent, or Firm*—Richard L. Aitken; Venable

[57] ABSTRACT

A probe for a spectrometer has a slot for receiving a sample, an illuminating fiber optic bundle directing light to the sample in the slot, and first and second collecting fiber optic bundles transmitting light from the sample to the spectrometer, wherein the first collection fiber optic bundle is positioned to optimize the collection of transmitted light without scattering through the sample, and the second collection fiber optic bundle is positioned to optimize the collection of light diffusely reflected from the sample. In one embodiment, the first collection bundle is arranged in an annulus around the illuminating bundle, and the second collection bundle is arranged in an annulus around the first collection bundle. In a second embodiment, the second collection bundle is arranged in an annulus around the illuminating bundle, and the first collection bundle terminates in an interface with the sample located across the slot from the illuminating bundle and the second collection bundle.

13 Claims, 2 Drawing Sheets

INSTRUMENT AND METHOD FOR SPECTROSCOPIC ANALYSIS BY REFLECTANCE AND TRANSMITTANCE

FIELD OF INVENTION

The present invention relates to a method and apparatus used for spectrometric transmittance and reflectance measurements and, in particular, NIR reflectance and transmittance measurements of fluids which undergo a change in transmissivity. The invention is particularly suited to the in situ analysis of chemical reactions which undergo significant changes during a batch manufacturing process.

BACKGROUND OF THE INVENTION

Spectrometric analysis is a non-invasive and non-destructive manner in which to determine both qualitative and quantitative properties of compositions. Infrared analysis and more particularly near-infrared ("NIR") analysis, is particularly suited to the analysis of organic compounds. The infrared absorption spectrum is highly characteristic, and is sometimes referred to as the molecular fingerprint. The natural vibrational frequencies of molecules and crystals fall within the infrared range and therefore the infrared region is valuable for the study of the structure of matter. Certain molecular bonds are prone to vibrate when exposed to characteristic wavelengths of infrared light which causes the molecules to absorb infrared light. Near infrared spectroscopy takes advantage of this activity by measuring the absorption of an unknown sample at various wavelengths throughout the near infrared range. Infrared light which is either reflected from or transmitted through a sample exhibits a highly characteristic spectrum showing the absorption of the sample at various predetermined wavelengths. The wavelength and magnitude of the absorption, as revealed in a spectrograph (a graphical representation of the absorbance values), can be used to determine information about the molecular structure and composition of the sample. Infrared spectrometry has proven to be a valuable tool for analysis of a wide variety of products including milk, grains, oils, gasoline, alcohols, and pharmaceutical products.

It is often desirable to use an optical probe to interface with the sample by being directly inserted into a sample gas or liquid. In general, measuring devices used for infrared spectroscopy require a near infrared light source and a light detector contained in an instrument known as a spectrometer. Light which has been either reflected from or transmitted through a sample is broken down into narrow wavelength bands either before or after interaction with the sample. In some arrangements, fiber optic cables transmit the light to and from the sample in a probe which provides an appropriate interface with the sample. The narrow wavelength bands are then directed to a light detector which then transmits a signal indicative of the intensity of the detected light. The signal is then analyzed or interpreted to yield absorbance data which in turn provides information about the constituent make-up of the sample.

Absorbance measurements are generally of reflectance, transmittance or combined transmittance and reflectance. Reflectance measurements involve directing light at a sample and then collecting the light which is diffusely reflected or scattered either from the surface of a sample or from molecules or crystals contained within a sample. A portion of the light diffusely reflected from the sample is directed back to a light sensitive detector system where it is converted to a signal. In the detection operation, the output of the photodetectors is sampled to yield values which indicate the intensity of the reflected light at the narrow wavelength bands. The analysis of reflectance measurements involves scanning a standard, often in the form of a white reflective tile. The value of the signal generated from light reflected from the standard is compared with the light reflected from the sample to yield a value representing the absorbance of the sample. Reflectance measurements are routinely employed in the measurement of solids and non-Newtonian matter such as chemical powders and solid agricultural products.

A second type of infrared analysis, which is referred to as transmittance or transmission, involves directing infrared light at a sample and then measuring the unscattered light which has passed through the sample. Incident light which has passed directly through the sample without scattering is directed to a detector. The detector then generates a signal from which absorbance values of the substance being analyzed are determined. As in the case of reflectance measurements, an absorption spectrum can be created which sets forth the absorbance of the sample plotted as a function of wavelength. Transmittance measurements also require a standard or reference measurement which approximates 100 percent transmittal of light. Usually the reference measurement is taken with an empty sample cell or a cell containing a clear liquid. The value of the signal from light transmitted through the sample is compared with the value of the signal obtained from the standard to yield an absorbance value. Because of the limits in the sensitivity of the instruments, transmission absorption spectra are generally limited to samples which are relatively transparent to infrared light.

A third, hybrid method of spectrometric measurement involves the simultaneous collection of both light diffusely reflected from and light transmitted through a sample. This measurement also involves providing an illuminating source which transmits infrared light to a probe immersed within the sample. Sample material can flow into a slot provided on the end of the probe and defined by a window and an opposite mirror. Light is transmitted from the probe through the window and then through the sample, where it impinges on the mirror. From the mirror, light is reflected back again through the sample and back through the window, where it is collected by suitable means, such as fiber optics, and directed to a detector. In this arrangement, some of the light from the illuminating source falls directly on matter suspended within the sample and consequently is scattered by the sample. A portion of the scattered light is reflected back to the collection optical fibers. Thus, in certain circumstances, the collection fibers capture both unscattered light which has been transmitted through the sample and light which has been diffusely reflected by the sample.

Most batch reaction processes begin as translucent media and, as the reaction proceeds, the media can become strongly light scattering. Measurement of this type of reaction process presents significant challenges with conventional spectroscopic techniques. For example, to successfully monitor initial reaction conditions, a transmittance measurement is necessary. To provide adequate measurement as light scattering increases, a reflectance measurement is necessary. Therefore, with traditional spectroscopic instrumentation, two measurement modes are necessary usually requiring two probes for entry into a fluid being processed.

Most instruments are designed to collect either the reflected light or the transmitted light from a sample. This allows for the simplest designs and optics but is not optimum for the application of the technology. It is estimated that 80% to 90% of processing is batch processing rather than continuous processing. Most reactions start as mixtures of slurries, or as liquids going to solids, or as solids going to liquids. In these cases, the current analysis systems allow only a portion of the reaction to be monitored.

SUMMARY OF THE INVENTION

It is an object of the invention to provide a single probe and spectrometer which can be effectively used to measure a sample reaction product by its reflectivity characteristics and its transmissivity characteristics.

By the present invention, a batch reaction can be measured during any stage of the reaction with a single process sample probe. In order to provide this advantage, a probe has one fiber optic bundle used for illumination and two fiber optic bundles used for collection. The process sample interface arrangement optimizes collection of light transmitted through the sample without scattering by one of the collection fiber optic bundles in the transmittance mode and optimizes collection of diffusely reflected light by the other collection fiber optic bundle in the reflectance mode. Adding the third fiber optic bundle (second collecting fiber optic bundle) to the instrument allows optimizing the collection of the diffusely reflected light when scattering is high and optimizing the collection of the transmitted light when scattering is low. This means that accurate measurements can be made over the entire duration of the reaction using a single probe and the apparatus has the advantage of decreasing the costs associated with installation of the apparatus on a reaction vessel.

The instant invention involves an apparatus and method of light analysis, especially infrared analysis, designed for in situ monitoring of batch type reactions or processes. The apparatus according to the invention employs an infrared light source, a probe, a grating, an infrared light detector which generates a signal and a signal analyzer. Infrared light is directed from the light source to a sensing head of the probe by a fiber optic bundle. The probe contains optical fibers which collect light which has been either transmitted through or diffusely reflected from the sample and directs the light to a grating where the light is divided into its constituent wavelengths bands in the NIR range. From the grating, infrared light is directed towards a detection device which generates a signal in response to the intensity of the light. Signals from the detection device are analyzed according to either reflectivity or transmissivity algorithms. The respective algorithms are predetermined and involve different calibrations. They are dependant on the specific reaction or process which is to be monitored and measured and the criteria governing the algorithm is developed from historical data using analytical methods. Thus, the probe can function in both reflectance mode and a transmittance mode. The user employs a single probe and applies to the light collected by the probe the algorithm appropriate for the mode.

According to a preferred method of use of the device, when the sample initially is at least relatively transmissive or transparent, a series of transmittance measurements of the sample material is made first. The signals generated in the spectrometer as a result are analyzed using a transmittance algorithm. As the material undergoing the reaction becomes more opaque to infrared light, transmittance measurements can not be made effectively because the intensity of light which is transmitted through the sample material is diminished to such a degree that it is difficult to obtain sufficient data to obtain reliable measurements from light which passes unscattered through the sample. Under these conditions, measurement of the sample material is continued by measuring the reflectance of the sample. In this mode, the analysis of the signal is interpreted according to a reflectance algorithm. Because the instrument is switchable between modes, the probe used in connection with the transmission measurements can still be employed as the sample material radically changes its chemical and physical characteristics.

In accordance with another method of the invention, the material which is to be measured is initially in an opaque state. For example, a solid in powdered or crystallized form is introduced to a liquid to result in a thick slurry. Accordingly, in the initial stages of the process, reflectance measurements are made first and a reflectance algorithm is utilized. The mixture is then heated and stirred until it transforms to a transparent or translucent condition. Transmittance measurements are then made and analyzed according to the transmittance algorithm.

DETAILED DESCRIPTION OF THE PREFERRED EMBODIMENTS

Figure 1:
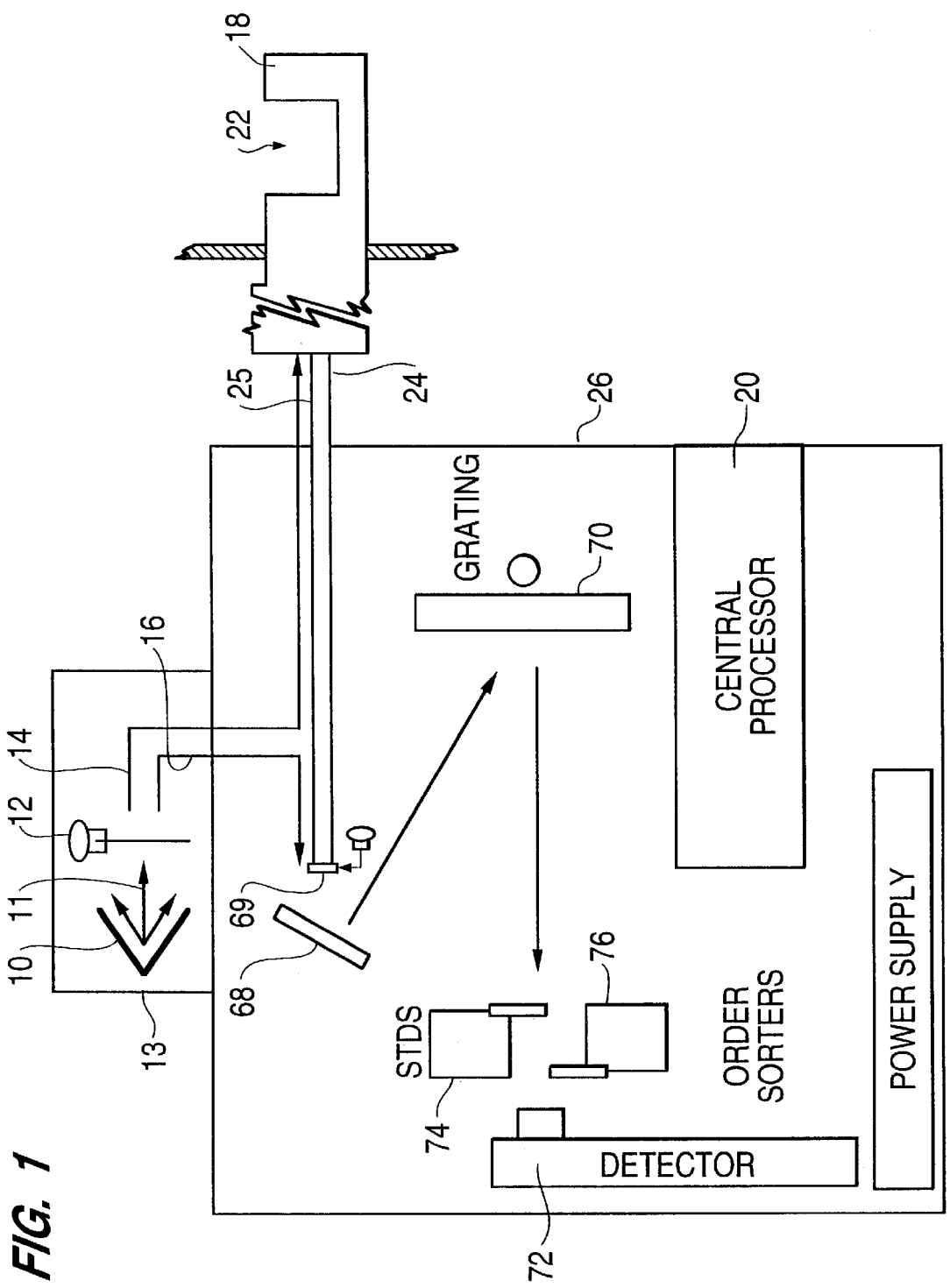
FIG. 1 is a schematic plan view of the optical measuring system according to the invention.

As can be seen from FIG. 1, the apparatus according to the invention has a near-infrared ("NIR") light source 10 which sends a continuous beam 11 of infrared light past a shutter 12 where it can impinge either on an end of an illuminating optical fiber bundle 14 or on an end of a reference optical fiber bundle 16. Although the optical fiber arrangement of the invention will be described as of bundles of fibers, in some situations an optical fiber arrangement may consist of a single fiber. The light source 10, the shutter 12 and the respective fiber optic bundle ends are contained by an enclosure 13. Operation of the shutter 12 controls the NIR light source 10 to impinge on either the illuminating fiber bundle 14 or the reference fiber bundle 16. The shutter 12 is operated in response to a command from a central processing unit 20 located within an optical enclosure 26.

The fiber optic bundle 14 provides a link or conduit to transmit infrared light from the NIR source 10 to a probe generally designated by reference numeral 18. The probe 18 provides an interface at a sample area or slot 22 with a sample material, which is to be analyzed. A first bundle 24 of collection optical fibers originates in probe 18 and terminates adjacent to an end of the fiber optic bundle 16 inside the optical enclosure 26 of the instrument. A second bundle 25 of collection optical fibers originates in the probe 18 and terminates inside the optical closure 26, adjacent to ends of the fiber optic bundles 16 and 24. The reference fiber optic bundle 16 transmits light from the light source 10 directly into the optical enclosure 26. The arrangement in this manner provides infrared light at a relevant value which can be compared against the light which interacts with the sample. Accordingly, any fluctuations in the intensity of the light source can be appropriately accounted for in the analysis operation. The reference fiber bundle 16 also eliminates the need for a standard, such as a white tile, in the reflectance mode because the bundle can serve as a surrogate for a reflectance standard.

Figure 2:
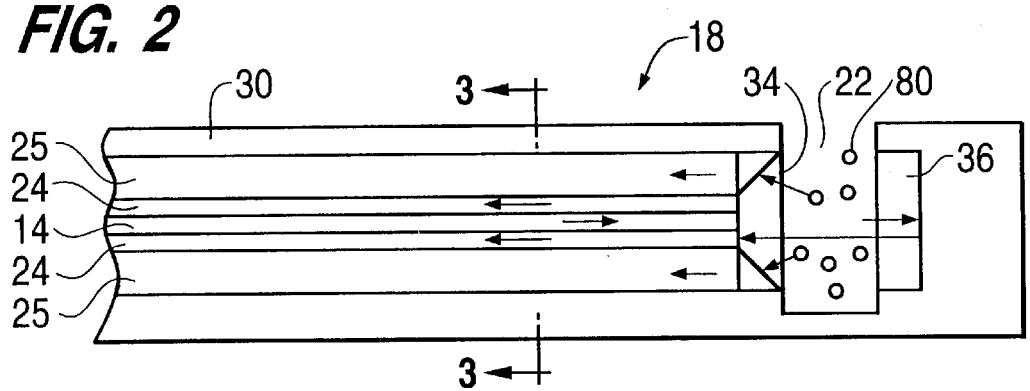
FIG. 2 is a schematic partial side sectional view of a first embodiment of the probe according to the invention.

As can be seen from FIG. 2, the probe 18 comprises an outer cylindrical housing 30 which receives and surrounds the illuminating optical fiber bundle 14 and the collecting fiber bundles 24 and 25, all of which terminate adjacent to a window 34 at the slot 22. The window 34 is made of sapphire or other suitable material which is impervious to the sample material and can otherwise withstand the environment of the reaction chamber. The inner surface of the window 34 is in the form of a truncated cone and the fiber bundles 24 and 25 abut the center planar portion of the inner window surface. The distal end of the fiber bundle 25 is in the same plane as the distal ends of the fiber bundles 14 and 24 and is opposite to and spaced from the conical inner surface of the window 34. The outer surface of the window 34, which is planar, defines the inner side of the slot 22. Sapphire is characterized by good chemical inertness and excellent transmission properties, particularly for near-infrared wavelengths, and is the preferred material for the window. A mirror 36 made of, for example, polished hastelloy, is positioned in axial alignment with the window 34 on a side of the slot 22 opposite to the window. As an alternative, the mirror 36 can be formed of sapphire having a surface coated with an appropriate reflective material such as gold to reflect infrared light back to the collecting fiber bundle 24. The window 34 and the mirror 36 partially define the slot 22, which is the location into which a sample material can flow and can be subjected to infrared light. The mirror 36 is mounted in a fixed position with respect to the outer housing 30. The bottom of the slot 22 is defined by a flat surface, and the slot generally has a rectangular profile which allows fluid to freely pass into the sample area in a direction perpendicular to the axis of the probe 18. The window 34, which provides for the interface between the infrared light and the sample, caps and seals the probe 18.

As is explained below, the distal end of the fiber optic bundle 24 is positioned to optimize collection of light transmitted directly through the sample without being scattered and the distal end of the fiber optic bundle 25 is positioned to optimize collection of light diffusely reflected by the sample. As shown in FIG. 1, the first and second collection fiber bundles 24 and 25 have ends directed toward a mirror 68 through a beam selector 69, which may be a shutter mechanism. The beam selector 69 is controlled by the central processor 20 to pass to the mirror 68 either the beam of light received from the fiber optic bundle 24, or the bean light received from the fiber optic bundle 25. Light transmitted through the fiber optic bundle 16 is also directed to the mirror 68. The mirror 68 will direct infrared light received back from the sample through one of the fiber optic bundles 24 or 25, or the infrared light transmitted directly from the source 10 through fiber optic bundle 16, to a grating 70. The grating 70 disperses the infrared light into a spectrum and directs specific wavelengths of light to a detector 72 as the grating oscillates relative to a beam of the light coming from the mirror 68. According to the preferred embodiment of the invention as depicted in FIG. 1, a post-dispersive grating monochrometer is employed. Alternatively, the infrared light could be divided into wavelengths before interacting with the sample. Adjacent to the light path between the grating 70 and the detector 72 are standards 74 which can be periodically moved into the light path when the instrument is instructed by the central processing unit 20 to perform measurements using an algorithm for transmission measurements. The standards may be moved into the path of light in response to a command from a central processing unit 20 at predetermined times. Before reaching the detector 72, the light may also be filtered through an appropriate order sorter 76 so that higher order, or lower order wavelengths, are removed. The order sorter filters 76 are controlled by the central processing unit 20 to coordinate the interposition of the correct filter for the wavelength which is passing from the grating 70 to the detector 72.

As light for each wavelength impinges on the detector 72, the detector transmits an electric signal representative of the intensity of the detected light. The electric signals generated by the detector 72 are transmitted to an analyzer which translates the signals into useful information regarding the absorbance properties of the sample. Application of an algorithm to the signals interprets quantitative and qualitative aspects of the sample. It is contemplated that other types of analysis could be employed, including artificial intelligence techniques or intuitive analysis by experts who can analyze graphical representations of the data by comparing the unknown data with the graphs of known compounds.

In order to operate the apparatus, the apparatus is first calibrated, and the constants of appropriate algorithms are determined. This operation involves making measurements of the process with the apparatus at a series of time intervals while simultaneously physically removing a sample of the material undergoing the process. The sample is then analyzed by traditional analytical chemistry methods, e.g., NMR, titration, or use of specific reagents. The results of the analytical tests are then correlated to infrared scans taken at the time the sample is removed, and a mathematical model is created. This procedure is referred to as the reference step and is repeated a number of iterations throughout several processes in order to obtain accurate data for a number of reference runs. For each given manufacturing process, a data base or a calibration sample set is created. Then, a mathematical process is employed, such as a multi-variant regression analysis or multi linear regression, to correlate the spectral signature of the unknown sample to the known values and determine constants for an algorithm to analyze material being processed. The apparatus thus provides an output which may reflect both qualitative and quantitative information regarding the material.

The measurement with the apparatus according to the present invention involves immersing the tip of the probe 18 into the sample which is undergoing either a chemical or physical change. In response to a command to scan the sample, the shutter 12 is opened and a full spectrum of near-infrared light is directed through the illuminating fiber bundle 14. At alternating time intervals, the full infrared spectrum is also directed through the reference fiber bundle 16. In order to ensure that fluctuations in the intensity of the infrared light source 10 do not adversely affect the measurement, the absorbance values are determined by comparing the values of the signals generated by light received from the collection fiber bundles 24 or 25 with the values of the signals generated in response to light from the reference fiber bundle 16. The use of the reference fiber bundle 16 eliminates the need for measurements from both a reflective tile, as is customarily practiced in conventional reflectance measurements, and an empty sample chamber cell, as is used in conventional transmittance measurements.

Figure 3:
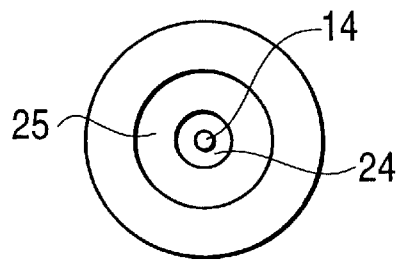
FIG. 3 is a cross-section taken along the line 3—3 in FIG. 2.

As can be seen from FIG. 2, the probe 18 has a body in which the slot 22 for receiving the sample is defined. The illuminating fiber bundle 14 extends longitudinally through the probe 18, near the center of a transverse cross-section of the probe, as can be seen from FIG. 3. The first collection fiber bundle 24 is arranged in a ring or annulus around and adjacent to the illuminating fiber bundle 14, particularly at the window 34. The second collection fiber bundle 25 is arranged in a ring or annulus around the first collection fiber bundle 24 spaced from the illuminating fiber bundle 14, particularly at the window 34.

Infrared light transmitted through the fiber optic bundle 14 will pass through the window 34 and enter the sample in the slot 22. Infrared light which passes through the sample in the slot and strikes the mirror 36 is reflected back toward the window 34. Transmitted light which passes through the sample without being scattered travels in a straight line through sample in both directions. As a result the transmitted unscattered light will be concentrated near the center of the window 34. The distal ends of the fibers of the fiber bundle 24 by being positioned near the center of the window are thus placed in an optimum position to receive the unscattered light transmitted through the sample. Scattering particles 80 in the sample will scatter reflected light in all directions and if there are scattering particles in the sample, some scattered light will be collected by the fiber optic bundle 24, but for samples which are highly transmissive, the intensity of the transmitted light collected by the fiber optic bundle 24 will be much greater than any scattered light which is collected by fiber bundle 24. Some of the light diffusely reflected by the sample will pass through the window 34 in a direction to be collected by the second collection fiber bundle 25 and transmitted into the enclosure 26. Because the unscattered light transmitted through the sample will be concentrated near the center of the window, little or no unscattered light is collected by the fiber bundle 25. Thus, the distal ends of the optical fibers in the bundle 24 are positioned to optimize the collection of unscattered light transmitted through the sample, and the distal ends of the optical fibers in the bundle 25 are positioned optimize the collection of diffusely reflected light. When the sample is highly transmissive, the instrument will be operated in the transmittance mode and the beam selector 69 will select the light transmitted through the fiber optic bundle 24 to be passed to the mirror 68. When the sample is relatively opaque, the instrument is operated in the reflectance mode and the beam selector 69 will select the beam transmitted through the fiber optic bundle 25 to be passed to the mirror 68.

In an alternative arrangement to the embodiment shown in FIG. 1, the function of the illuminating and receiving fiber optic bundles are reversed. Thus, the fiber bundles 24 and 25 could be used as illumination fiber optic bundles and the fiber bundle 14 used as a receiving fiber optic bundle. In such an arrangement, the proximal ends of the fiber bundles 24 and 25 would be brought into the enclosure 13 and the shutter 12 would be arranged to selectively introduce light from the light source into the bundle 24, the bundle 25 or the bundle 16. In this arrangement, the fiber optic bundle 14 would receive light transmitted through or reflected from the sample and the proximal end of the fiber bundle 14 would emit light to be reflected from the mirror 68 to illuminate the grating 70. In this arrangement, when the bundle 24 is selected to transmit the light from the light source, the light received by the fiber bundle 14 from the sample will be largely light transmitted through the sample without scattering and when the bundle 25 is selected to transmit light from the light source, the fiber bundle 24 will receive light scattered from the sample. Thus, by selecting which of the fiber optic bundles 24 or 25 is selected to receive light from the light source, the probe is controlled to operate either in a transmittance mode or a reflectance mode. In the above-described alternative embodiment, the beam switcher 69 is not required.

Figure 5:
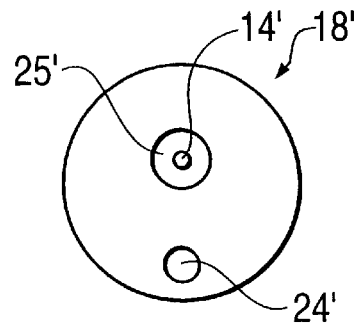
FIG. 5 is a cross-section taken along the line 5—5 in FIG. 4.
Figure 4:
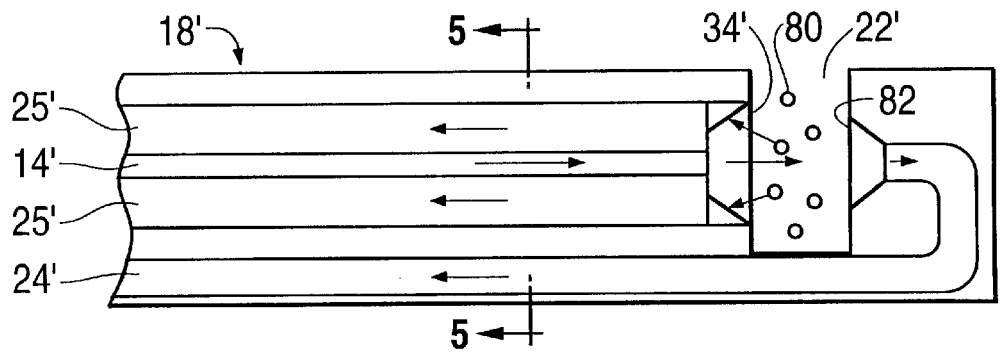
FIG. 4 is a schematic partial side sectional view of a second embodiment of the probe according to the invention.

As can be seen from FIGS. 4 and 5, in an alternate embodiment, a probe 18' has a body defining a slot 22' filled by a fluid sample which may contain particles 80. An illuminating fiber bundle 14' extends through the probe 18' along the length thereof and near the center of a transverse cross-section thereof to a window 34' on one side of the slot 22'. A window 82 is positioned on the opposite side of the slot 22' and in alignment with the window 34'. A distal end of a first collection fiber bundle 24' terminates at the window 82 to receive light entering the window and to transmit the light into the enclosure 26. A second collection fiber bundle 25' is arranged in a ring or annulus around the illumination fiber bundle 24', the distal end of each of the two bundles terminating at a window 34'. The windows 34' and 82 can comprise the same material as the window 34 of the embodiment of FIGS. 2 and 3.

Light from illuminating fiber bundle 14' passing through the sample without being scattered will pass through the window 82 and be collected by the first collection fiber bundle 24' to be transmitted into the enclosure 26. Some of the light from the illumination fiber bundle 14' which is diffusely reflected from the sample in the slot 22' will be transmitted through the window 34' and be collected by the second collection fiber bundle 25' and be transmitted into the enclosure 26.

In both illustrated embodiments, the probe has one fiber bundle which is optimally positioned to collect unscattered light transmitted through the sample for analyzing the sample in a transmittance mode and a second fiber optic bundle which is optimally positioned to collect light diffusely reflected from the sample for analysis of the sample in a reflectance mode without interference from unscattered light passing through sample. The alternative arrangement wherein the function of the illuminating and receiving fibers are reversed can also be applied to the embodiment of FIGS. 4 and 5. In the alternative arrangements, there are two illuminating fiber optic bundles and one receiving fiber optic bundle.

It will be apparent to those skilled in the art and it is contemplated that variations and/or changes in the embodiments illustrated and described herein may be made without departure from the present invention. Accordingly, it is intended that the foregoing description is illustrative only, not limiting, and that the true spirit and scope of the present invention will be determined by the appended claims.

What is claimed is:

1. A probe for an spectrometer for measuring a sample comprising:

a body defining a slot for receiving the sample;

a specularly reflecting surface on one side of said slot;

means for directing light into the sample received in the slot toward said reflecting surface;

a first optical fiber arrangement positioned to collect light reflected from said reflecting surface back through said slot and primarily transmitted through said sample without scattering and transmitting the collected light to a light detector;

a second optical fiber arrangement positioned to collect primarily light diffusely reflected from the sample in the slot and transmitting the collected light to a light detector;

said second fiber optic arrangement having a distal end at said slot shaped in an annulus around said first optical fiber arrangement.

2. The probe of claim 1, wherein the first optical fiber arrangement comprises a first fiber optic bundle and the second optical fiber arrangement comprises a second fiber optic bundle.

3. The probe of claim 1, wherein said means for directing light, the first optical fiber arrangement, and the second optical fiber arrangement have interfaces with the slot and, at the interfaces, and the first optical fiber arrangement is in an annulus around said means for directing light.

4. The probe of claim 1, wherein the means for directing light comprises means for directing infrared light.

5. A spectrometer for analyzing a sample having infrared absorbance properties comprising:

an infrared light source;

a light detector for converting the intensity of light incident thereon into an electrical signal;

a probe having a body defining a slot receiving a sample to be measured;

an illuminating fiber optic arrangement directing light from the light source into the sample received in the slot;

a first collection fiber optic arrangement transmitting to the light detector primarily light transmitted without scattering through the sample in the slot; and a second collection fiber optic arrangement transmitting to the light detector primarily light diffusely reflected from the sample in the slot;

means defining a light path extending from said light source through said illuminating fiber optic arrangement into said slot, and through said first or second collection fiber optic arrangement, to said detector;

means forming part of said light path to disperse light transmitted in said light path into a spectrum for spectroanalysis; and an analyzer receiving said electrical signal and operable to translate said electrical signal into information regarding the infrared absorbance properties of the sample in said slot.

6. The spectrometer of claim 5, wherein the first collection optical fiber arrangement comprises a first fiber optic bundle and the second collection optical fiber arrangement comprises a second fiber optic bundle.

7. A spectrometer as recited in claim 5, further comprising a third collection fiber optic arrangement, means to selectively transmit light from said source through said third fiber optic arrangement to provide a reference for said spectroanalysis.

8. A spectrometer as recited in claim 5 further comprising a beam selector positioned to receive light from said first and second collection fiber optic arrangements and being operable to selectively pass light received from said first collection fiber optic arrangement or received from said second collection fiber optic arrangement to said means to disperse light.

9. A spectrometer for analyzing a sample comprising:

a light source;

a light detector;

a probe having a body defining a slot receiving a sample to be measured;

an illuminating fiber optic arrangement directing light from the light source into the sample received in the slot;

a first collection fiber optic arrangement transmitting to the light detector primarily light transmitted without scattering through the sample in the slot; and a second collection fiber optic arrangement transmitting to the light detector primarily light diffusely reflected from the sample in the slot;

means to disperse light from said light source into a spectrum for spectroanalysis; said first collection optical fiber arrangement comprising a first fiber optic bundle and said second collection fiber optic arrangement comprising a second fiber optic bundle;

said illuminating fiber optic arrangement and the first and second collection fiber optic arrangements having interfaces with the slot and, at the interfaces, the first collection fiber optic arrangement being in an annulus around the illuminating fiber optic arrangement, and the second collection fiber optic arrangement being in an annulus around the first collection fiber optic arrangement.

10. The spectrometer of claim 9, wherein the interfaces are all positioned on one side of the slot, the spectrometer further comprising a reflector positioned across the slot from the interfaces.

11. A spectrometer for analyzing a sample comprising:

a light source;

a light detector;

a probe having a body defining a slot receiving a sample to be measured;

an illuminating fiber optic arrangement directing light from the light source into the sample received in the slot;

a first collection fiber optic arrangement transmitting to the light detector primarily light transmitted without scattering through the sample in the slot; and a second collection fiber optic arrangement transmitting to the light detector primarily light diffusely reflected from the sample in the slot;

means to disperse light from said light source into a spectrum for spectroanalysis;

said first collection optical fiber arrangement comprising a first fiber optic bundle and said second collection fiber optic arrangement comprising a second fiber optic bundle;

said illuminating fiber optic arrangement and the first and second collection fiber optic arrangements having interfaces with the slot and, at the interfaces, the second collection fiber optic arrangement being in an annulus around the illuminating fiber optic arrangement, and the first collection fiber optic arrangement being positioned on an opposite side of the slot from the interfaces of the illuminating fiber optic arrangement and the second collection fiber optic arrangement.

12. A method of measuring a material having infrared absorbance properties undergoing change in its light transmittance and reflectance characteristics comprising:

positioning in the material a probe having a slot such that the material is in the slot;

directing infrared light into the material in the slot;

detecting with the probe any of the light transmitted without scattering through the material in the slot by sending such transmitted light to a detector through a first fiber optic arrangement having a first interface with the material in the slot, wherein the first interface is positioned to optimize reception of such transmitted light; and detecting with the probe light diffusely reflected from the material in the slot by sending such reflected light to the detector through a second fiber optic arrangement having a second interface with the material in the slot, wherein the second interface is positioned to optimize reception of such reflected light;

analyzing said material by spectroanalysis by means of the light transmitted through said first fiber optic arrangement or the light transmitted through said second fiber optic arrangement, said analyzing including translating the light detection by said probe into information regarding the infrared absorbance properties of said material in the slot.

13. A spectrometer for analyzing a sample having an infrared absorbance property comprising an infrared light source, a light detector for converting the intensity of light incident thereon into an electric signal, a probe having a body defining a slot receiving a sample to be measured, a first illuminating fiber arrangement directing light from the light source into the sample received in the slot, a second illuminating fiber arrangement for directing light from said source into the sample received in the slot, a collection fiber optic arrangement transmitting to the light detector light introduced into the sample in said slot from said first illuminating fiber optic arrangement or introduced into the sample in said slot from said second illuminating fiber optic arrangement, said first illuminating fiber optic arrangement being positioned relative to said collection fiber optic arrangement so that light introduced into the sample in said slot from said first illuminating optic fiber arrangement and received by said collection fiber optic arrangement is primarily light transmitted through said slot without scattering, said second illuminating fiber optic arrangement being positioned relative to said collection fiber optic arrangement so that light introduced into the sample in said slot from said second illuminating fiber optic arrangement and received by said collection fiber optic arrangement is primarily light diffusely reflected from the sample in said slot, means to selectively introduce light from said source into said first illuminating fiber optic arrangement or said second fiber optic arrangement, means defining a light path extending from said light source through said first or second illuminating fiber optic arrangement, into said slot, and through said collection fiber optic arrangement to said light detector, means to disperse light transmitted in said light path into a spectrum for spectral analysis.

* * * * *